United States Patent
Guo et al.

(10) Patent No.: US 10,044,872 B2
(45) Date of Patent: Aug. 7, 2018

(54) ORGANIZING CONFERENCE CALLS USING SPEAKER AND TOPIC HIERARCHIES

(71) Applicant: International Business Machines Corporation, Armonk, NY (US)

(72) Inventors: Shang Q. Guo, Cortlandt Manor, NY (US); Christopher P. Jones, Las Vegas, NV (US); Jonathan Lenchner, North Salem, NY (US); Daniel A. Mazzella, Henderson, NV (US); John C. Nelson, Newtown, CT (US); Rodrigo A. Rey, Lake Oswego, OR (US); Adarsh Saxena, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 14/670,631

(22) Filed: Mar. 27, 2015

(65) Prior Publication Data
US 2016/0286049 A1    Sep. 29, 2016

(51) Int. Cl.
*G06Q 10/00* (2012.01)
*H04M 3/56* (2006.01)
(Continued)

(52) U.S. Cl.
CPC ............ *H04M 3/566* (2013.01); *G10L 25/48* (2013.01); *H04M 3/42221* (2013.01);
(Continued)

(58) Field of Classification Search
CPC ............ G06Q 10/00–50/00; H04L 1/00–69/00
(Continued)

(56) References Cited

U.S. PATENT DOCUMENTS

| 5,668,863 A | 9/1997 | Bieselin et al. |
| 6,104,989 A * | 8/2000 | Kanevsky ........... G06F 17/2715 |
| | | 704/257 |

(Continued)

FOREIGN PATENT DOCUMENTS

| EP | 1811759 A1 | 7/2007 |
| WO | 9701932 | 1/1997 |

OTHER PUBLICATIONS

Erickson, et al.; "Social Translucence: Designing Social Infrastructures that Make Collective Activity Visible"; IBM T. J. Watson Research Center.
(Continued)

*Primary Examiner* — Alan S Miller
(74) *Attorney, Agent, or Firm* — Edward J. Wixted, III

(57) ABSTRACT

In an approach for creating a hierarchal organization of spoken conference call topics, a processor determines an identity of a first speaker from a group of participants on a conference call, wherein the group of participants are known. A processor determines a first conference call topic, wherein the first conference call topic is determined using a portion of the first speaker's speech. A processor adds a second speaker's identity to a queue of speakers while recording the first speaker's voice. A processor determines a second conference call topic. A processor links the first conference call topic and the second conference call topic into a hierarchal organization of spoken conference call topics.

20 Claims, 3 Drawing Sheets

(51) Int. Cl.
*H04M 3/42* (2006.01)
*H04W 4/06* (2009.01)
*G10L 25/48* (2013.01)
*G10L 17/00* (2013.01)
*G10L 15/18* (2013.01)
*G10L 15/26* (2006.01)

(52) U.S. Cl.
CPC ........... *H04W 4/06* (2013.01); *G10L 15/1822* (2013.01); *G10L 15/26* (2013.01); *G10L 17/00* (2013.01)

(58) Field of Classification Search
USPC ................ 705/7.11–7.42; 709/202–207, 224
See application file for complete search history.

(56) References Cited

U.S. PATENT DOCUMENTS

| | | | |
|---|---|---|---|
| 6,298,129 B1 | 10/2001 | Culver et al. | |
| 6,683,632 B2* | 1/2004 | Newman | H04L 29/06 715/841 |
| 6,792,448 B1* | 9/2004 | Smith | H04L 12/1827 709/204 |
| 6,839,417 B2 | 1/2005 | Weisman et al. | |
| 7,039,677 B2* | 5/2006 | Fitzpatrick | H04L 12/1827 709/204 |
| 7,200,635 B2* | 4/2007 | Yashchin | G06Q 10/107 707/999.009 |
| 7,236,580 B1* | 6/2007 | Sarkar | H04M 3/42221 379/202.01 |
| 7,466,334 B1* | 12/2008 | Baba | G11B 27/034 348/14.06 |
| 7,503,006 B2* | 3/2009 | Danieli | A63F 13/12 463/42 |
| 7,725,538 B2* | 5/2010 | Kirkland | H04L 51/04 709/204 |
| 7,739,109 B2* | 6/2010 | Rui | H04N 7/147 379/158 |
| 7,739,261 B2* | 6/2010 | Zeng | G06F 17/30731 704/9 |
| 7,856,469 B2* | 12/2010 | Chen | H04L 12/1831 709/203 |
| 8,166,408 B2* | 4/2012 | Castellucci | G06Q 10/107 715/733 |
| 8,290,134 B2 | 10/2012 | Jaiswal et al. | |
| 8,332,477 B1* | 12/2012 | Kaiserlian | H04L 51/16 709/206 |
| 8,385,526 B2 | 2/2013 | Smelyansky et al. | |
| 8,649,494 B2* | 2/2014 | Basson | G10L 15/22 370/260 |
| 8,654,951 B1* | 2/2014 | Olmsted | G06F 17/241 379/202.01 |
| 8,739,045 B2* | 5/2014 | Pang | H04L 65/4038 715/753 |
| 8,898,578 B1* | 11/2014 | Hecht | H04M 3/56 379/202.01 |
| 8,971,511 B2* | 3/2015 | Shaffer | H04M 3/42187 379/202.01 |
| 9,230,546 B2* | 1/2016 | O'Sullivan | G10L 15/26 |
| 9,300,790 B2* | 3/2016 | Gainsboro | H04M 3/2281 |
| 9,332,319 B2* | 5/2016 | Tsai | H04N 21/4884 |
| 9,342,845 B1* | 5/2016 | Haugen | G06Q 30/0277 |
| 9,560,206 B2* | 1/2017 | Jones | H04M 3/56 |
| 9,591,141 B1* | 3/2017 | Bostick | H04L 65/4015 |
| 2003/0023684 A1* | 1/2003 | Brown | H04L 12/1827 709/204 |
| 2003/0131055 A1* | 7/2003 | Yashchin | G06Q 10/107 709/204 |
| 2004/0021765 A1* | 2/2004 | Kubala | H04N 7/15 348/14.08 |
| 2004/0117448 A1* | 6/2004 | Newman | G06F 17/30707 709/206 |
| 2005/0032539 A1* | 2/2005 | Noel | H04W 72/10 455/518 |
| 2005/0149621 A1* | 7/2005 | Kirkland | H04L 51/16 709/207 |
| 2005/0235034 A1* | 10/2005 | Chen | H04L 51/04 709/206 |
| 2006/0155785 A1* | 7/2006 | Berry | G06Q 10/10 |
| 2007/0071206 A1* | 3/2007 | Gainsboro | H04M 3/2281 379/168 |
| 2007/0263821 A1* | 11/2007 | Shaffer | H04M 3/42187 379/202.01 |
| 2007/0263823 A1* | 11/2007 | Jalava | H04M 3/56 379/202.01 |
| 2008/0091656 A1* | 4/2008 | Charnock | G06F 17/30713 |
| 2009/0028316 A1* | 1/2009 | Jaiswal | H04M 3/566 379/202.01 |
| 2009/0094329 A1* | 4/2009 | Ambati | G06Q 10/10 709/204 |
| 2009/0327400 A1* | 12/2009 | Singh | G06F 17/30663 709/202 |
| 2010/0205541 A1* | 8/2010 | Rapaport | G06Q 10/10 715/753 |
| 2010/0229127 A1* | 9/2010 | Williams | G06F 3/0482 715/854 |
| 2011/0270609 A1* | 11/2011 | Jones | H04M 3/56 704/235 |
| 2012/0134485 A1 | 5/2012 | Bennett et al. | |
| 2012/0226997 A1* | 9/2012 | Pang | H04L 65/4038 715/753 |
| 2012/0278388 A1 | 11/2012 | Kleinbart et al. | |
| 2013/0058471 A1* | 3/2013 | Garcia | H04M 3/42221 379/202.01 |
| 2013/0110565 A1* | 5/2013 | Means, Jr. | G06Q 10/063 705/7.11 |
| 2013/0117018 A1* | 5/2013 | O'Sullivan | G10L 15/26 704/235 |
| 2013/0246525 A1* | 9/2013 | Patil | G06Q 10/107 709/204 |
| 2013/0346595 A1* | 12/2013 | Bulut | H04L 67/2833 709/224 |
| 2015/0006568 A1* | 1/2015 | Brunn | G06F 17/30864 707/769 |
| 2015/0106091 A1* | 4/2015 | Wetjen | G10L 15/26 704/235 |
| 2016/0028895 A1* | 1/2016 | Bell | H04W 4/06 455/416 |

OTHER PUBLICATIONS

Sussman, et al; "Rendezvous: Designing a VoIP Conference Call System"; IBM T.J. Watson Research Center.

Ding, et al. "An Empirical Study of the Use of Visually Enhance VoIP Audio Conferencing: The Case of IEAC"; CHI 2007; Apr. 28-May 3, 2007; San Jose, CA; ACM 1-59593-178-3/06/0004.

Wellner, et al.; "Conference Scribe: Turning Conference Calls into Documents"; Proceedings of the 34th Hawaii International Conference on System Sciences; 2001.

Yankelovich; "Private communications in public meetings"; ACM Digital Library; CHI '05 Extended Abstracts on Human Factors in Computing Systems; ISBN:1-59593-002-7. Copyright 2005. <http://dl.acm.org/citation.cfm?id=1057044>.

* cited by examiner

ORGANIZING CONFERENCE CALLS USING SPEAKER AND TOPIC HIERARCHIES

BACKGROUND OF THE INVENTION

The present invention relates generally to the field of conference calling, and more particularly to organizing and recording conference calls using speaker and topic hierarchies.

A conference call is a telephone call in which the calling party wishes to have more than one called party listen in to the audio portion of the call. The conference call may be designed to allow the called party to participate during the call, or the call may be set up so that the called party merely listens into the call and cannot speak. A conference call is sometimes called an audio tele-conference (ATC). Conference calls can be designed so that the calling party calls the other participants and adds them to the call; however, participants are usually able to call into the conference call, themselves, by dialing a telephone number that connects to a conference bridge. A conference bridge is a specialized type of equipment that links telephone lines.

A hierarchy is an arrangement of items (e.g., objects, names, values, categories, etc.) in which the items are represented as being above, below, or at the same level as one another. In the present invention a hierarchy is used to depict the division of a discussion into topics, sub-topics, sub-sub-topics, and so on. The highest level of the hierarchy is thought of as the discussion itself.

SUMMARY

Aspects of an embodiment of the present invention disclose a method, computer program product, and computing system for creating a hierarchal organization of spoken conference call topics. A processor determines an identity of a first speaker from a group of participants on a conference call, wherein the group of participants are known. A processor determines a first conference call topic, wherein the first conference call topic is determined using a portion of the first speaker's speech. A processor adds a second speaker's identity to a queue of speakers while recording the first speaker's voice. A processor determines a second conference call topic. A processor links the first conference call topic and the second conference call topic into a hierarchal organization of spoken conference call topics.

DETAILED DESCRIPTION

Figure 1:
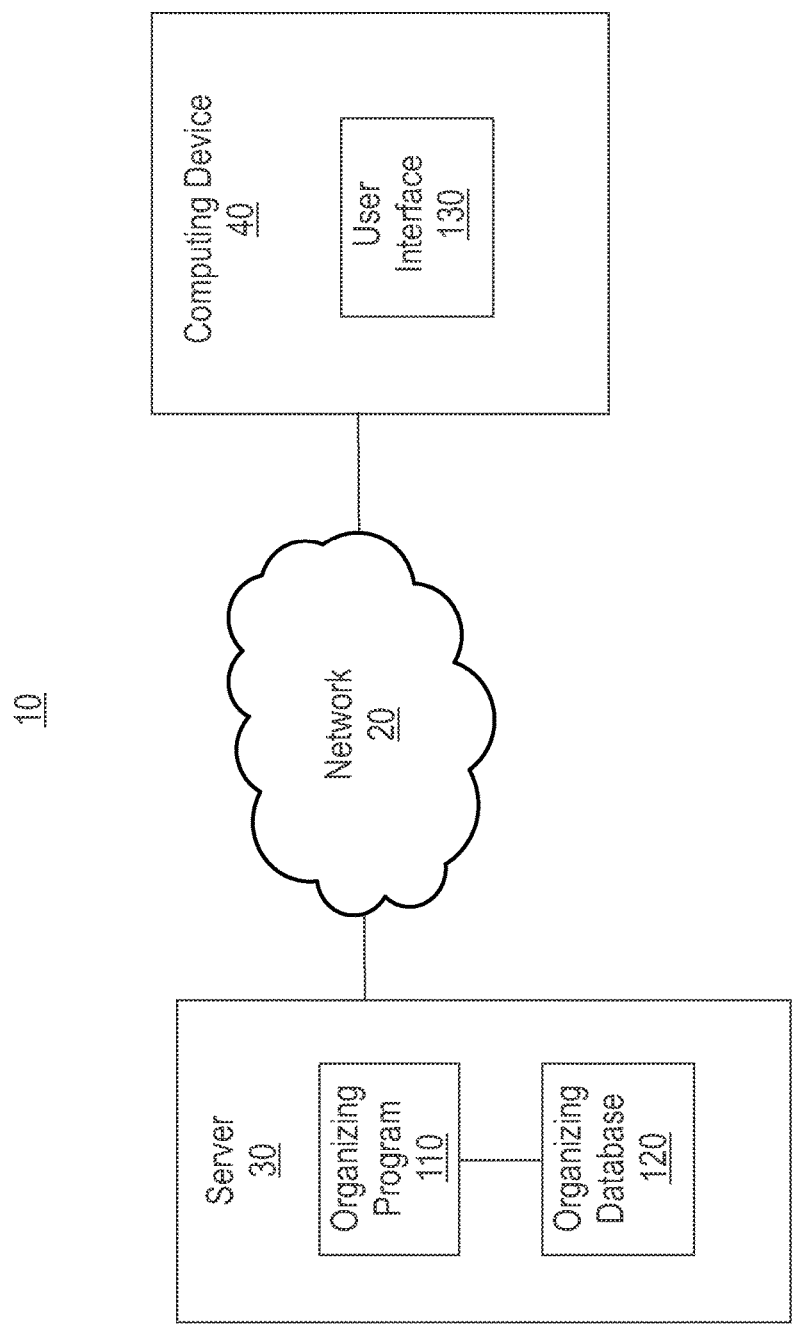
FIG. 1 depicts a block diagram of a computing system, in accordance with an embodiment of the present invention.

With the current state of conference calling, there are several known problems. First, in the current state of conference calling, there are no systematic means for participants, with the intention of speaking, to form a response/next-to-speak queue; the next participant to speak is usually the person who can get their voice heard first. Second, participants who want to speak next often have to speak over another participant. Finally, in cases where conference calls are recorded for later play back, there is no depiction of the speaking order of the participants, how long the participants spoke, and who is responding to whom, so that it is more difficult than necessary for a person replaying the call to go directly to a point of interest in a call.

There are current techniques to address the aforementioned problems. One technique used in videos or video conferencing, incorporates one or more pictures from the video or of the speaking participants. A subsequent viewer of the recorded video, in the case of a video conference obtains a general idea of what the video is about or, at least, the identity of the speaking participant at selected moments during the call. Embodiments of the present invention recognize that this technique only works in video, not audio recordings. Moreover, embodiments of the present invention recognize that this technique at best captures the change of speaking participants, not who is responding to whom and with respect to what topic they are responding, requiring a viewer to spend more time than necessary to locate a point of interest in the recording. In recognition of this limitation of the existing art, embodiments of the present invention capture not only the change of speaking participants, but also a notion of who is responding to whom, and also what topic the response is associated with. Embodiments of the present invention work equally well in audio recordings as well as video recordings.

Another technique is for a participant to tag interesting parts of a recorded video/audio session, either during a recording or afterwards. These tags require participant action and do not consistently mark the beginning and ending of speaking segments. Moreover, the tags do not give a graphical sense of an entry and exit of speaking participants in a conversation. In recognition, embodiments of the present invention use automatic tags that consistently mark the beginning and ending of speaking segments and give a graphical sense of an entry and exit of speaking participants in a conversation.

An additional technique incorporated in some applications allows participants to "raise their hands" while another participant is speaking. This technique of queueing up does not precisely display when in the audio/video streaming that a participant decided to queue up; therefore, the response context is lost. Furthermore, after a number of participants have spoken, this technique loses the ability to distinguish the person to whom the responding participant is responding with their remarks. In recognition, embodiments of the present invention display when in the audio/video streaming that a participant decided to queue up, allowing the ability to distinguish the person to whom the responding participant is responding. Embodiments of the present invention detail a program that can be used to organize and record conference calls using speaker and topic hierarchies.

Embodiments of the present invention will now be described in detail with reference to the Figures.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains organizing program 110 and organizing database 120. In other embodiments, server 30 may include organizing program 110, organizing database 120, and/or other components, as depicted and described in further detail with respect to FIG. 4.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains user interface 130. In other embodiments, computing device 40 may include user interface 130 and/or other components, as depicted and described in further detail with respect to FIG. 4.

User interface 130 may be any user interface used to access information from server 30, such as information gathered and produced by organizing program 110. In some embodiments, user interface 130 may be a generic web browser used to retrieve, present, and traverse information resources from the Internet. In other embodiments, user interface 130 may be a software program or application that enables a user at computing device 40 to access server 30 over network 20. In the depicted embodiment, user interface 130 resides on computing device 40. In other embodiments, user interface 130, or similar user interfaces, may reside on another computing device, another server, or server 30, provided that user interface 130 is accessible to organizing program 110.

Organizing program 110 organizes and records conference calls using speaker and topic hierarchies. In doing so, organizing program 110 receives an indication of the beginning of a meeting. Organizing program 110 tracks the participants. Organizing program 110 generates a topic hierarchy and a speaker queue. Organizing program 110 receives on indication of the end of a meeting. In the depicted embodiment, organizing program 110 resides on server 30. In other embodiments, organizing program 110 may reside on another server, computing device, or computing device 40, provided that organizing program 110 can access organizing database 120 and user interface 130 via network 20.

Organizing database 120 may be a repository that may be written to and/or read by organizing program 110. In some embodiments, a program (not shown) may allow an administrator or other user to define various time intervals to be used for starting a meeting, ending a meeting, and/or changing between participants during a meeting and store to organizing database 120. In other embodiments, organizing database 120 may store already determined time intervals and information about completed meetings. In the depicted embodiment, organizing database 120 resides on server 30. In other embodiments, organizing database 120 may reside on another server, computing device, or computing device 40, provided that organizing database 120 is accessible to organizing program 110 via network 20.

Figure 2:
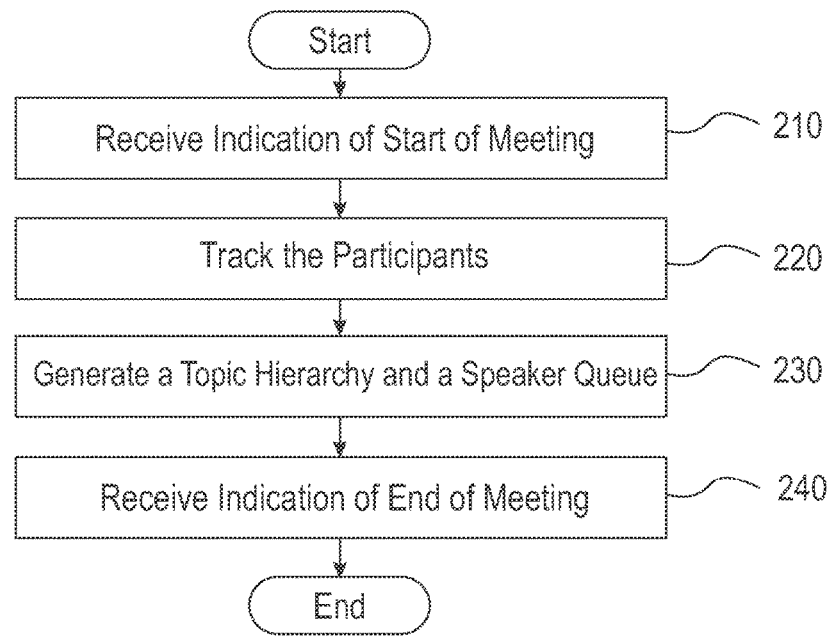
FIG. 2 depicts a flowchart of the steps of an organizing program, executing within the computing system of FIG. 1, for organizing and recording conference calls using speaker and topic hierarchies, in accordance with an embodiment of the present invention.

FIG. 2 depicts a flowchart of the steps of an organizing program, executing within the computing system of FIG. 1, in accordance with an embodiment of the present invention. Organizing program 110 organizes and records conference calls using speaker and topic hierarchies.

In step 210, organizing program 110 receives an indication of the start of a meeting. In some embodiments, organizing program 110 receives an indication of the start of a meeting from the moderator. In other embodiments, organizing program 110 receives an indication of the start of a meeting automatically, similar to a speaker tracking component. Here, after a participant begins to speak, organizing program 110 receives an indication that a meeting has started.

In step 220, organizing program 110 tracks participants. In one embodiment, organizing program 110 automatically tracks the one or more participants speaking during a conference call by associating a participant with the phone used. In other embodiments, organizing program 110 automatically tracks the one or more participants speaking during a conference call by associating a participant with the participant's voice through voice recognition capabilities. Still, in other embodiments, organizing program 110 automatically tracks the one or more participants speaking during a conference call by associating a participant with, both, the phone used and the participant's voice through voice recognition capabilities.

In step 230, organizing program 110 generates a topic hierarchy and a speaker queue. In one embodiment, organizing program 110 automatically generates a discussion topic hierarchy. When a new participant is detected, in one embodiment, organizing program 110 does speech-to-text conversion and captures the first few seconds of spoken text and uses this text as the topic. In other embodiments, organizing program 110 mines the topic of conversation from the speech-to-text conversion, with the topic possibly migrating over time (i.e., changing over time as the discussion changes course).

In near real-time, shortly after a participant begins to speak, the topic appears in a user interface for visual inspection by the participants of the conference call. In addition to the depiction of a topic, user interface 130 displays an icon of the participant speaking. The icon may include a picture, name, and/or some other token (e.g., a colored dot) designating the given participant.

In one embodiment, when a participant decides to join the speaker queue, the participant indicates an intention to speak by clicking a "respond" button in user interface 130. Clicking the "respond" button adds the participant's icon to a topic hierarchy and a speaker queue, while capturing and presenting the preceding text of the current speaker to user interface 130. For example, if the responding participant is set to be the second speaker, then the second participant's icon is at the front of the queue of speakers following a removal of the first speaker's icon at the front of the queue of speakers. Through user interface 130, participants, including the participant intending to speak, can see some context around the reason that the participant chose to enter the speaker queue. The queued participant's icon is displayed in a "muted" mode. When it is the participant's turn to speak, the icon changes to an "unmuted" mode, and the topic discussed begins from the point where the previous participant left off. The new topic is considered a sub-topic of the previous topic, since the decision to speak was made prior to the completion of the previous participant's speech. The new topic is associated with words spoken close to a point in time during the recording of the first speaker's voice. If a participant would like to speak but is not responding to a prior participant, the participant clicks a "new topic" button in user interface 130. It is possible to respond to any thread of conversation from the meeting at any time.

In one embodiment, organizing program 110, in conjunction with the aforementioned icons going from a muted to an unmuted mode, controls the phones, such that if a participant has queued up to speak next, no other participants can speak up first. In other embodiments, the speaking participant is given the option to mute other participants.

In one embodiment, organizing program 110 gives a warning when organizing program 110 detects a pause in speaking (e.g., two seconds of silence or any other predetermined interval of silence) that in three additional seconds (or any other predetermined interval of time) the microphone will be ceded, either to the next queued participant or opened if no participant is queued to speak. In one embodiment, organizing program 110 gives the warning through a visual screen prompt in user interface 130. In other embodiments, organizing program 110 gives the warning through an audio prompt.

In one embodiment, organizing program 110 chooses a participant to be a moderator. The role of the moderator allows the chosen participant to break into the conversation at any time without being queued up as an intended speaking participant. In one embodiment, organizing program 110 allows the moderator to change the order of queued participants. In other embodiments, organizing program 110 allows the moderator to delete queued participants. Still, in some embodiments, organizing program 110 allows the moderator to set participant speaking time limits.

In one embodiment, organizing program 110 has a playback component. The topic hierarchy is displayed through user interface 130, during and after a meeting. Organizing program 110 allows a participant to playback selected topics, or segments of a topic, in the topic hierarchy at any point during or after the meeting. In another embodiment, organizing program 110 stores the meeting to organizing database 120 for future use.

In step 240, organizing program 110 receives an indication of the end of a meeting. In one embodiment, organizing program 110 receives an indication of the end of a meeting from the moderator. In other embodiments, organizing program 110 receives an indication of the end of a meeting automatically, similar to the automatic muting and unmuting component. Here, after the microphone is ceded, there are no queued participants, and no one takes the microphone after a certain interval of time (e.g., 10 seconds), organizing program 110 receives an indication that a meeting is over.

Figure 3:
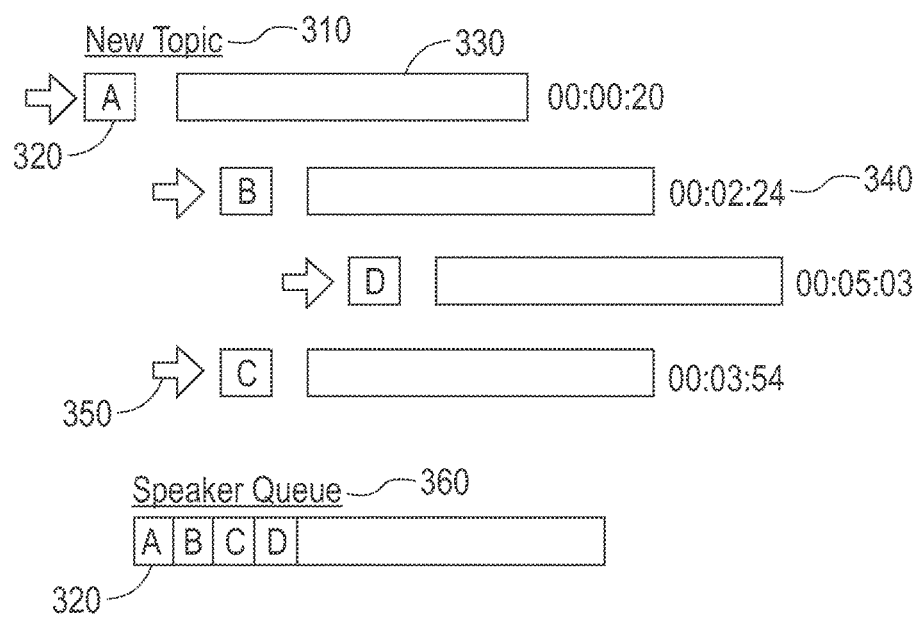
FIG. 3 depicts an example of a topic hierarchy during recording, in accordance with an embodiment of the present invention.

FIG. 3 depicts an example of a topic hierarchy during recording, in accordance with an embodiment of the present invention.

FIG. 3 depicts new topic 310, participant icon 320, text line 330, duration 340, respond button 350, and speaker queue 360. The depicted embodiment shows a display in user interface 130. A participant can click new topic 310 when the participant wants to speak on a topic that has not already been discussed. On the other hand, a participant can click respond button 350 when the participant wants to respond to the current topic or a previously discussed topic. When a participant starts speaking, in one embodiment, the first few seconds of audio will be converted to text to be labeled as a title for that participant's speech. In some embodiments, text line 330 is displayed next to participant icon 320, in addition to the topic to which the participant is responding or the new topic which the participant creates. When a participant stops talking, or there is enough text to do a reasonable summary, organizing program 110 displays a summary description of the speech. In some embodiments, during a participant's speech, duration 340 is displayed to keep track of the lapsed time of a participant's speech.

The following is an example of how a topic hierarchy is generated during a meeting. In FIG. 3, participant A starts to speak. While participant A is speaking, participant B gains interest and enters speaker queue 360. While participant A is speaking, participant C also gains interest and enters speaker queue 360. At the completion of participant A's speech, participant B starts to speak. While participant B is speaking, participant D gains interest and enters speaker queue 360. At the completion of participant B's speech, participant C starts to speak. At the completion of participant C's speech, participant D starts to speak. In one embodiment, after the meeting and through recording analysis, organizing program 110 displays a more precise topic hierarchy in user interface 130.

Figure 4:
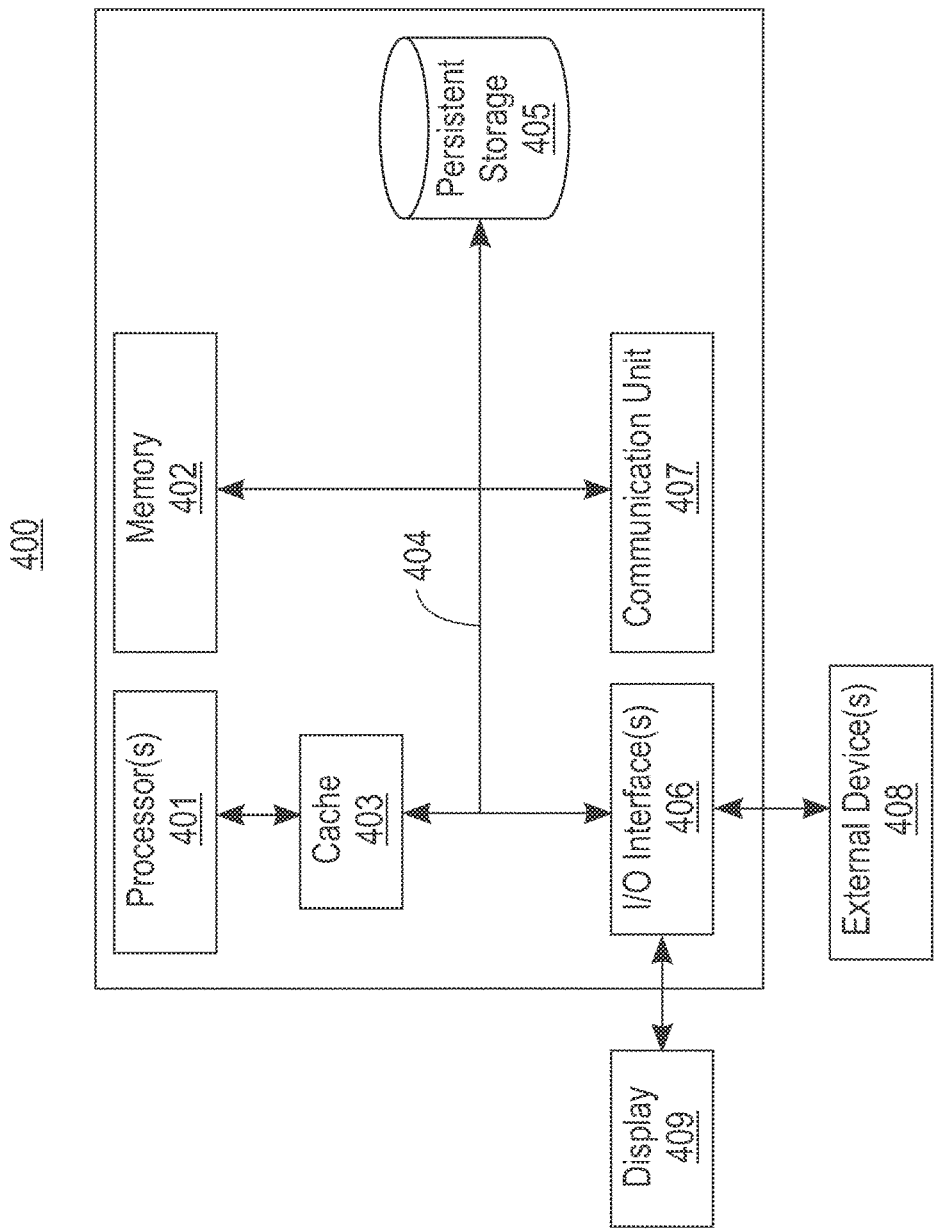
FIG. 4 depicts a block diagram of components of the server and/or the computing device, in accordance with an embodiment of the present invention.

FIG. 4 depicts computer system 400, which is an example of a system that includes components of server 30 and/or computing device 40. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. Organizing program 110 and organizing database 120 may be downloaded to persistent storage 405 of server 30 through communications unit 407 of server 30. User interface 130 may be downloaded to persistent storage 405 of computing device 40 through communications unit 407 of computing device 40.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., organizing program 110 and organizing database 120, can be stored on such portable computer readable storage media and can be loaded onto persistent storage 405 of server 30 via I/O interface(s) 406 of server 30. Software and data used to practice embodiments of the present invention, e.g., user interface 130, can be stored on such portable computer readable storage media and can be loaded onto persistent storage 405 of computing device 40 via I/O interface(s) 406 of computing device 40. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a hierarchal organization of spoken conference call topics, the method comprising:
   determining, by one or more processors, an identity of a first speaker from a group of participants on a conference call, wherein the group of participants are known;
   determining, by one or more processors, a first conference call topic, wherein the first conference call topic is determined using a first portion of the first speaker's speech;
   adding, by one or more processors, a second speaker's identity to a queue of speakers while recording the first speaker's voice and capturing and presenting a second portion of the first speaker's speech to the group of participants, wherein the second portion of the first speaker's speech is a portion of the first speaker's speech directly preceding the second speaker's identity being added to the queue of speakers, and wherein the second portion of the first speaker's speech adds context for a reason to add the second speaker's identity to the queue of speakers;
   determining, by one or more processors, a second conference call topic, wherein the second conference call topic is associated with words spoken close to a point in time during the recording of the first speaker's voice when the second speaker's identity is at front of the queue of speakers following a removal of the identity of the first speaker at the front of the queue of speakers, wherein the second conference call topic is a sub-topic of the first conference call topic;
   linking, by one or more processors, the first conference call topic and the second conference call topic into a hierarchal organization of spoken conference call topics;
   detecting, by one or more processors, a pause in the first speaker's voice for a predetermined interval of silence;
   displaying, by one or more processors, through a visual screen prompt, a warning to the group of participants that, in a predetermined interval of time, a first microphone will automatically mute for the first speaker and a second microphone will automatically unmute for the second speaker; and
   subsequent to a lapse of the predetermined interval of time, and through control of a first phone line and a second phone line, deactivating, by one or more processors, the first phone line, causing the first microphone to mute, while, simultaneously, activating the second phone line, causing the second microphone to unmute.

2. The method of claim 1, wherein determining the identity of the first speaker and the second speaker comprises:
   associating, by one or more processors, the first speaker and the second speaker with a phone used during the conference call.

3. The method of claim 1, wherein determining the identity of the first speaker and the second speaker comprises:
   associating, by one or more processors, the first speaker and the second speaker with the first speaker's voice and the second speaker's voice through voice recognition capabilities.

4. The method of claim 1, further comprising:
   displaying, by one or more processors, a complete hierarchal organization of spoken conference call topics in a user interface after the conference call ends using recording analysis, wherein each conference call topic comprises a text summary of speech and a duration of time associated with each speaker.

5. The method of claim 1, wherein determining the second conference call topic comprises:
   using, by one or more processors, a user interface to choose a new conference call topic, wherein the new conference call topic is different from the first conference call topic.

6. The method of claim 1, further comprising:
   displaying, by one or more processors, the first conference call topic in a user interface in near real-time after the first speaker begins to speak.

7. The method of claim 1, wherein the second speaker in the queue of speakers is in a muted mode and the first speaker is in an unmuted mode while the first speaker is speaking.

8. A computer program product for creating a hierarchal organization of spoken conference call topics, the computer program product comprising:
one or more computer readable storage media and program instructions stored on the one or more computer readable storage media, the program instructions comprising:
program instructions to determine an identity of a first speaker from a group of participants on a conference call, wherein the group of participants are known;
program instructions to determine a first conference call topic, wherein the first conference call topic is determined using a first portion of the first speaker's speech;
program instructions to add a second speaker's identity to a queue of speakers while recording the first speaker's voice and capturing and presenting a second portion of the first speaker's speech to the group of participants, wherein the second portion of the first speaker's speech is a portion of the first speaker's speech directly preceding the second speaker's identity being added to the queue of speakers, and wherein the second portion of the first speaker's speech adds context for a reason to add the second speaker's identity to the queue of speakers;
program instructions to determine a second conference call topic, wherein the second conference call topic is associated with words spoken close to a point in time during the recording of the first speaker's voice when the second speaker's identity is at front of the queue of speakers following a removal of the identity of the first speaker at the front of the queue of speakers, wherein the second conference call topic is a sub-topic of the first conference call topic;
program instructions to link the first conference call topic and the second conference call topic into a hierarchal organization of spoken conference call topics;
program instructions to detect a pause in the first speaker's voice for a predetermined interval of silence;
program instructions to display, through a visual screen prompt, a warning to the group of participants that, in a predetermined interval of time, a first microphone will automatically mute for the first speaker and a second microphone will automatically unmute for the second speaker; and
subsequent to a lapse of the predetermined interval of time, and through control of a first phone line and a second phone line, program instructions to deactivate the first phone line, causing the first microphone to mute, while, simultaneously, activating the second phone line, causing the second microphone to unmute.

9. The computer program product of claim 8, wherein program instructions to determine the identity of the first speaker and the second speaker comprise:
program instructions to associate the first speaker and the second speaker with a phone used during the conference call.

10. The computer program product of claim 8, wherein program instructions to determine the identity of the first speaker and the second speaker comprise:
program instructions to associate the first speaker and the second speaker with the first speaker's voice and the second speaker's voice through voice recognition capabilities.

11. The computer program product of claim 8, further comprising:
program instructions, stored on the one or more computer readable storage media, to display a complete hierarchal organization of spoken conference call topics in a user interface after the conference call ends using recording analysis, wherein each conference call topic comprises a text summary of speech and a duration of time associated with each speaker.

12. The computer program product of claim 8, wherein program instructions to determine the second conference call topic comprise:
program instructions to use a user interface to choose a new conference call topic, wherein the new conference call topic is different from the first conference call topic.

13. The computer program product of claim 8, further comprising:
program instructions, stored on the one or more computer readable storage media, to display the first conference call topic in a user interface in near real-time after the first speaker begins to speak.

14. The computer program product of claim 8, wherein the second speaker in the queue of speakers is in a muted mode and the first speaker is in an unmuted mode while the first speaker is speaking.

15. A computer system for creating a hierarchal organization of spoken conference call topics, the computer system comprising:
one or more computer processors, one or more computer readable storage media, and program instructions stored on the computer readable storage media for execution by at least one of the one or more processors, the program instructions comprising:
program instructions to determine an identity of a first speaker from a group of participants on a conference call, wherein the group of participants are known;
program instructions to determine a first conference call topic, wherein the first conference call topic is determined using a first portion of the first speaker's speech;
program instructions to add a second speaker's identity to a queue of speakers while recording the first speaker's voice and capturing and presenting a second portion of the first speaker's speech to the group of participants, wherein the second portion of the first speaker's speech is a portion of the first speaker's speech directly preceding the second speaker's identity being added to the queue of speakers, and wherein the second portion of the first speaker's speech adds context for a reason to add the second speaker's identity to the queue of speakers;
program instructions to determine a second conference call topic, wherein the second conference call topic is associated with words spoken close to a point in time during the recording of the first speaker's voice when the second speaker's identity is at front of the queue of speakers following a removal of the identity of the first speaker at the front of the queue of speakers, wherein the second conference call topic is a sub-topic of the first conference call topic;
program instructions to link the first conference call topic and the second conference call topic into a hierarchal organization of spoken conference call topics;
program instructions to detect a pause in the first speaker's voice for a predetermined interval of silence;
program instructions to display, through a visual screen prompt, a warning to the group of participants that, in a predetermined interval of time, a first microphone will automatically mute for the first speaker and a second microphone will automatically unmute for the second speaker; and subsequent to a lapse of the predetermined interval of time, and through control of a first phone line and a second phone line, program instructions to deactivate the first phone line, causing the first microphone to mute, while, simultaneously, activating the second phone line, causing the second microphone to unmute.

16. The computer system of claim 15, wherein program instructions to determine the identity of the first speaker and the second speaker comprise:

program instructions to associate the first speaker and the second speaker with a phone used during the conference call.

17. The computer system of claim 15, wherein program instructions to determine the identity of the first speaker and the second speaker comprise:

program instructions to associate the first speaker and the second speaker with the first speaker's voice and the second speaker's voice through voice recognition capabilities.

18. The computer system of claim 15, further comprising:

program instructions, stored on the computer readable storage media for execution by at least one of the one or more processors, to display a complete hierarchal organization of spoken conference call topics in a user interface after the conference call ends using recording analysis, wherein each conference call topic comprises a text summary of speech and a duration of time associated with each speaker.

19. The computer system of claim 15, wherein program instructions to determine the second conference call topic comprise:

program instructions to use a user interface to choose a new conference call topic, wherein the new conference call topic is different from the first conference call topic.

20. The computer system of claim 15, further comprising:

program instructions, stored on the computer readable storage media for execution by at least one of the one or more processors, to display the first conference call topic in a user interface in near real-time after the first speaker begins to speak.

\* \* \* \* \*